United States Patent [19]

Gröger

[11] 4,076,221

[45] Feb. 28, 1978

[54] USE OF AN ACID-RESISTING CEMENT FOR THE PROTECTION AGAINST CORROSION OF STEEL SURFACES EXPOSED TO HOT GASES

[75] Inventor: Rolf Gröger, Oberhausen, Germany

[73] Assignee: August Thyssen-Hütte AG, Duisburg-Hamborn, Germany

[21] Appl. No.: 738,987

[22] Filed: Nov. 4, 1976

[30] Foreign Application Priority Data

Nov. 5, 1975 Germany ............................ 2549506

[51] Int. Cl.² ................................................ C21B 9/06

[52] U.S. Cl. ........................................ 266/44; 264/30; 264/32; 266/280; 266/285

[58] Field of Search ...................... 264/30, 32; 266/44, 266/270, 280, 283, 284, 285

[56] References Cited

U.S. PATENT DOCUMENTS 3,528,647 9/1970 Hyde ............................... 266/285 X

*Primary Examiner*—Roy Lake
*Assistant Examiner*—Paul A. Bell
*Attorney, Agent, or Firm*—Burgess, Dinklage & Sprung

[57] ABSTRACT

In the operation of a furnace for the production of iron or steel, the air preheater and the pipe communicating the preheater with the furnace are constructed of steel shells lined with an acid-resisting cement, with refractory lining overlying the cement. The acid-resisting cement is composed of quartz sand and refractory material in the form of hollow spheres, silicate binder, and hardener. The spheres are 10 - 40 vol.% of the total volume of quartz sand and spheres.

9 Claims, No Drawings

USE OF AN ACID-RESISTING CEMENT FOR THE PROTECTION AGAINST CORROSION OF STEEL SURFACES EXPOSED TO HOT GASES

BACKGROUND

The problem that the hot and aggressive corrosive Cowper gases and condensates produced during blast furnace blast heating cause a great deal of damage to steel by corrosion, exists in the steel industry in particular. The corrosion effect of the Cowper gases can be explained as follows: It has to be seen that the Cowper work regeneratively i.e. at least one of the air preheaters is heated by flue gas (spent gas) up to a temperature of about 1450° C and that this flue gas contains $SO_2$ and $SO_3$ and water vapour which may form sulfuric acid by condensation. The chance for this condensation is high if the refractory lining is not sealed and so the corrosive parts of the gas have the chance to condense on the cold steel shell. Furthermore after heating the Cowper to 1450° C and switching over the hot Cowper for the preheating of air the nitrogen within the air may be oxidized and may form by reaction of the humid air $HNO_2$ by condensation. This causes corrosion problems for the steel shell. The backgrounds are explained in detail in the German Auslegeschrift 1,955,063, column 1 and 2. During the heating of the air the lining of the Cowper cools down to about 800° C whereafter a new cycle of heating by flue gas is started. These high fluctuations in temperature during the regenerative operation of the Cowper causes cracks within the refractory lining, so that the aggressive parts of the flue gas or the air have a higher chance to reach and condense on the steel shell. This corrosion damage is caused on the one hand in the steel shell of the blast preheater (Cowper) and on the other hand in the hot-air pipes leading from the blast preheater to the blast furnace. This problem is particularly apparent in the form of stress corrosion cracking at the welding joints.

This problem is not new to blast furnace plants. A series of proposals for overcoming the existing difficulties has already been made in the prior art. In the German Auslegeschrift 1,955,063 a proposal is made to dispose a metal or heat-resistant plastic film between the inner surface of the steel and the refractory brickwork. In the German Offenlegungsschrift 2,206,207 it is proposed that a second steel shell should be provided in place of the film. This second steel shell is arranged in such a way that a space is formed between the two steel shells into which the gas may be introduced. The gas should not contain any corrosive constituents. Another development is described in the German Offenlegungsschrift 2,410,657, wherein a bonding film composed of high-temperature stabilized polyolefine is proposed as film.

Another proposal for a protective measure against corrosion relates to spraying an acid-resisting cement onto the inner surfaces of the metal, particularly steel, in danger of corroding (Merkblatt Oberflaechentechnik HOECHST, Saurekitt, Sept. 1974, A 1187/D). The acid-resisting cement proposed there as a protective measure against corrosion should be applied onto the steel surfaces in danger of corroding in the form of a coating without joints of for example 10 – 25 mm according to the type of fireclay spraying process. It is known that these acid-resisting cements contain quartz sand, silicate binder and hardener. The quartz sand may be present as pure $SiO_2$. However, quartz sand in the natural state will be generally used. Normally, a sodium or potassium silicate binder is introduced as the binder. The dry acid-resisting cement contains about 2 – 7 vol.% silicate binder, the addition of hardener is coordinated to this amount and the remainder is essentially quartz sand. The hardener can be a condensed aluminum phosphate as disclosed in the German Auslegeschrift 1,571,485 and German Patent 1,252,835 of the Hoechst Company, in amount of 0.5 to 6 vol.%, preferably 1.0 to 4 vol.%.

THE INVENTORY

Working from the last-mentioned proposal for protection against corrosion for hot, aggressive media, especially gaseous media, the object of the present invention is to develop a means of protection against corrosion, whih better absorbs the expansion and contraction loads of steel sheets and of the refractory materials on the basis of the above explained fluctuations in temperature. This problem is particularly serious in the blast preheater and the hot-air pipes thereof, as considerable fluctuations in temperature arise due to the technical course in this case of usage. Consequently, temperatures of up to over 1450° C are reached in the cupola of the blast preheater during the heating up periods, after which a considerable drop in temperature occurs after reversal in the blast period due to the cold blast air being heated or in the case of stoppages.

It has surprisingly been proved that the durability of the protective layer against corrosion, with the given purpose of usage and particularly in the case of great fluctuations in temperature, can be considerably improved if 10 – 40% vol. of the total amount of quartz is replaced by refractory materials in the form of hollow spheres. An acid-resisting cement is preferably used in which 15 to 35% vol. of the total amount of quartz, in particular 22 to 28% vol, is replaced by refractory materials in the form of hollow spheres. The amount of binder can be 2 to 7 vol.%, preferably 4 to 6 vol.%. The amount of hardener can be 0.5 to 6 vol.%, preferably 1 to 4 vol.%. The composition of the binder and hardener can be as is disclosed above for prior art cements.

Refractory materials in the form of hollow spheres belong in another context to the prior art. German Auslegeschrift 1,086,614 describes a refractory, sintered bonding body which contains a layer composed of refractory material in the form of hollow spheres for heat insulation. It can be further seen from this publication that it has been known for a long time that granules in the form of hollow spheres composed of refractory material are produced. Thus, alumina, quartz, mixtures of alumina and quartz and similar refractory materials are mentioned as material for the production of the hollow spheres.

An acid-resisting cement is preferably used according to the invention in which the refractory materials present in the form of hollow spheres of corundum (hollow sphere corundum).

It remains to bear in mind that the refractory material added in the form of hollow spheres corresponds to the volume amount which was removed from the known acid-resisting cement in the form of quartz sand. This means in other words that the thickness of the layer applied does not change, however, the structure does. The thickness of the layer amounts in practice to between 5 and 15 mm. Very good results have been achieved with layer thickness of up to 8 mm.

The particular advantages of the subject of the invention is to be seen in that the proposed acid-resisting cement is more flexible to fluctuations in temperature and therefore the movements of the refractory material and the steel shell are better absorbed. It is evident that the layer does not only act as a protection against corrosion but as an insulating layer for the movements which are caused by fluctuations in temperature. The layer consequently is very flexible. It has moreover been shown that this layer is less sensitive to subsequent moisture (wetting).

On the contrary, the known acid-resisting cement becomes relatively moist after spraying so that according to the prior art technique it may result in the sprayed-on elements falling, rolling or sliding away during overhead work, e.g. in the cupola of the blast preheater. This subsequent wetting is known to the specialist by the term "ionisation effect" and occurs on a considerably lower scale with the subject of the application.

The acid-resisting cement proposed according to the invention is preferably used for the steel shell of the blast heating apparatus of a blast furnace and for the hot-air pipe system appertaining thereto.

The invention is further explained as follows by means of an embodiment:

An acid-resisting cement according to the invention was used as protective means against corrosion to protect the cupola and the upper portion of the shaft of the blast preheater. The said acid-resisting cement, comprising quartz sand, a sodium silicate binder, a usual hardener and hollow sphere corundum, was composed as follows: 70 vol.% quartz sand; 4 vol.% sodium silicate binder, 1 vol.% of hardener, and 25 vol.% as hollow sphere corundum. The diameter of the hollow sphere corundum used was between about 0.06 and 2 mm. The diameter of the greater part of the hollow sphere corundum was about 1mm.

The acid-resisting cement serving as a protective means against corrosion was applied by the spraying process to the surface of the steel without anchorage by means of a rotor machine, which works continuously according to a revolving system. The dry means is mixed shortly before spraying with 14 wt.% water, based on the total weight of the dry means.

The surfaces which were to be protected were continuously covered with the protective means against corrosion without seams, the thickness of the layer amounting to about 8mm. The sprayed-on means was set after about 12 hours with the temperature of the sheet metal at about 20° C. Further lining comprising insulating layers and a refractory layer was then applied. Preferably the further lining consists of bricks.

The described blast heating apparatus of blast furnace reaches a temperature of about 1450° – 1500° C. in the area of the cupola and the upper shaft during the heating period, whereas in the blast period the temperature in the described areas decreases to about 1050° C. Despite these difference in temperature and the pressure connected therewith, which lead to the gradual loosening of the refractory lining and consequently permits corrosive means to penetrate to the vicinity of the sheet metal shell, no damage has occured after usage for one year and after usage for 2 years.

With comparable positive result the blast air steel pipes belonging to the blast heating apparatus of the blast furance were sprayed with the protective means against corrosion according to the invention and then lined with two insulating layers and a refractory layer.

The invention has been explained in detail by the example blast furnace and regeneration air preheaters as for this example the fluctuations in temperature during the regenerative phases amount to about 500° C.. It has to be recognized that the invention is also suitable for protecting the steel shell if the preheater is used to preheat reduction gas as in necessary for alternative processes for the blast furnace process. Such a process comprising a shaft furnace for the production of said iron and regenerative preheaters for preheating reduction gas is, for instance, disclosed in the U.S. Pat. Nos. 3,148,050 and 3,883,123. In general, the invention is suitable for preheating the steel of a preheater for the production of iron or steel, if the high fluctuations in temperature cause damage of the protecting refractory lining.

Vol.% herein for sand, spheres, binder, and hardener are for the batch composed of said materials, and which in the example is wetted with water and sprayed.

SUMMARY

Thus, the invention provides a process for preheating a reduction gas or air employed in producing or refining of iron or steel, wherein said reduction gas or air is passed through a preheater and from the preheater through a pipe to a furnace producing said iron or steel. The preheater and pipe comprise steel shells lined with an acid-resisting cement for protecting the steel from corrosion, and which is applied to the inner surfaces of the steel shells. Refractory lining, especially brickwork, is applied to the inner surface of the cement. The cement comprises quartz sand and refractory material in the form of hollow spheres, with the spheres being 10 – 40 vol.% of the total volume of the quartz sand and spheres, silicate binder for the cement, and hardener.

What is claimed is:

1. In a process for preheating a reduction gas or air employed in producing or refining of iron or steel wherein said reduction gas or air is passed through a preheater and from said preheater through a pipe to a producing or refining furnace for producing or refining said iron or steel the improvement wherein said preheater and said pipe comprise steel shells lined with an acid resisting cement for protecting the steel from corrosion, said acid resisting cement having on its inner surface averted from said steel shell a refractory lining, said cement comprising:

a) quartz sand and refractory material in the form of hollow spheres, said spheres being 10 – 40 vol.% of the total volume of the quartz sand and spheres,
b) silicate binder for the cement
c) hardener.

2. Process of claim 1, wherein said hollow spheres are 22 to 28 vol.% of the total volume of quartz sand and hollow spheres.

3. Process of claim 1, the hollow spheres comprising corundum.

4. Process of claim 1, wherein said cement is sprayed onto said steel shell to result in a lining thickness of 5 to 15 mm.

5. Process of claim 1, wherein the binder is at least one of sodium and potassium silicate.

6. Process of claim 1, wherein the amount of binder is 2 to 7 vol.%, the amount of hardener is 0.5 to 6 vol.%, and the balance is essentially said quartz sand and spheres.

7. Process of claim 4, wherein the amount of binder is 4 to 6 vol.%, the amount of hardener is 1 to 4 vol.%, and the balance is essentially said quartz sand and spheres.

8. Process of claim 1, wherein said furnace is communicated by said pipes alternately with one of at least two of said preheaters, said preheaters being regeneration preheaters which are alternately heated by flue gas and are available after heating for switching over for said preheating of said air or reduction gas.

9. Process of claim 1, wherein said furnace is a blast furnace communicated by said pipes alternately with one of two or three of said regeneration preheaters, the hot one of said preheaters preheating said air, whereas the other one or two are heated by said flue gas.

* * * * *